(12) United States Patent
Wang et al.

(10) Patent No.: US 11,593,507 B2
(45) Date of Patent: *Feb. 28, 2023

(54) SEARCHING FOR ENCRYPTED DATA WITHIN A CLOUD BASED PLATFORM

(71) Applicant: ServiceNow, Inc., Santa Clara, CA (US)

(72) Inventors: Paul Wang, Bellevue, WA (US); Qiang Gui, Kirkland, WA (US); Ashok Ganesan, Milpitas, CA (US); Brett Bandy, San Jose, CA (US); Ivan Valentine Covdy, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 17/163,815

(22) Filed: Feb. 1, 2021

(65) Prior Publication Data
US 2021/0150049 A1 May 20, 2021

Related U.S. Application Data

(63) Continuation of application No. 16/530,501, filed on Aug. 2, 2019, now Pat. No. 10,956,602, which is a (Continued)

(51) Int. Cl.
*H04L 29/06* (2006.01)
*G06F 21/62* (2013.01)
(Continued)

(52) U.S. Cl.
CPC ...... *G06F 21/6227* (2013.01); *G06F 16/2457* (2019.01); *G06F 21/6218* (2013.01);
(Continued)

(58) Field of Classification Search
CPC ............ G06F 21/6227; G06F 21/6218; H04L 9/0822; H04L 9/0866; H04L 63/0428; H04L 63/105
(Continued)

(56) References Cited

U.S. PATENT DOCUMENTS 6,321,229 B1    11/2001   Goldman
6,609,122 B1    8/2003    Ensor
(Continued)

OTHER PUBLICATIONS

ServiceNow, "Data Encryption with ServiceNow—Encryption Technologies for Data Protection on the ServiceNow Platform," 2017.

*Primary Examiner* — Longbit Chai
(74) *Attorney, Agent, or Firm* — Fletcher Yoder P.C.

(57) ABSTRACT

Searching encrypted data using encrypted contexts by performing at least the following: configuring a first encryption context that allows access to a first encrypted field, configuring a second encryption context that allows access to a second encrypted field, assigning the first encryption context to a first role and the second encryption context to a second role, assigning the first role to a first user account to allow the first user account to access the first encrypted field, assigning the second role to a second user account to allow the second user to access the second encrypted field, receiving a query request associated with the first user account for a search term, wherein the query request includes instructions to search for an unencrypted version of the search term and a first encrypted value of the search term that is based on the first encryption context.

20 Claims, 8 Drawing Sheets

Related U.S. Application Data continuation of application No. 15/723,828, filed on Oct. 3, 2017, now Pat. No. 10,402,581.

(51) Int. Cl.
  *H04L 9/08* (2006.01)
  *H04L 9/40* (2022.01)
  *H04L 9/14* (2006.01)
  *G06F 16/2457* (2019.01)

(52) U.S. Cl.
  CPC .......... *H04L 9/0822* (2013.01); *H04L 9/0866* (2013.01); *H04L 9/0894* (2013.01); *H04L 9/14* (2013.01); *H04L 63/0428* (2013.01); *H04L 63/105* (2013.01)

(58) Field of Classification Search
  USPC ........................................................ 713/189
  See application file for complete search history.

(56) References Cited

U.S. PATENT DOCUMENTS

| | | | |
|---|---|---|---|
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 4/2006 | Ding | |
| 7,131,037 B1 | 10/2006 | LeFaive | |
| 7,170,864 B2 | 1/2007 | Matharu | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,688,975 B2 | 3/2010 | Lin et al. | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,224,683 B2 | 7/2012 | Manos | |
| 8,266,096 B2 | 9/2012 | Navarrete | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,887,133 B2 | 11/2014 | Behnia | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,165,154 B2 * | 10/2015 | Auradkar | H04L 9/0866 |
| 9,239,857 B2 | 1/2016 | Trinon | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,535,737 B2 | 1/2017 | Joy | |
| 9,557,969 B2 | 1/2017 | Sharma | |
| 9,613,070 B2 | 4/2017 | Kumar | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 10,002,203 B2 | 6/2018 | George | |
| 2003/0050927 A1 | 3/2003 | Hussam | |
| 2007/0214250 A1 * | 9/2007 | Ahmed | G06Q 30/08 709/223 |
| 2014/0095860 A1 * | 4/2014 | Shikfa | H04L 9/008 713/150 |

* cited by examiner

SEARCHING FOR ENCRYPTED DATA WITHIN A CLOUD BASED PLATFORM

CROSS REFERENCE TO RELATED APPLICATIONS

This disclosure is a continuation of U.S. application Ser. No. 16/530,501 filed on Aug. 2, 2019, which is a continuation to U.S. application Ser. No. 15/723,828, filed on Oct. 3, 2017 (now U.S. Pat. No. 10,402,581 which issued on Sep. 3, 2019), both of which are herein incorporated by reference in their entirety.

TECHNICAL FIELD

Embodiments described herein generally relate to cloud computing and in particular querying and searching for encrypted data within data stores saved in a cloud computing environment.

BACKGROUND ART

Cloud computing involves sharing of computing resources that are generally accessed via the Internet. In particular, the cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment, and investing time in establishing a private network infrastructure. Instead, by utilizing cloud computing resources, users are able to redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing a local network or individual software installations, software is typically licensed on a subscription basis, hosted on a remote machine, and accessed as needed. For example, users are generally able to access a variety of enterprise and/or information technology (IT) related software via a web browser. PaaS acts an extension of SaaS that goes beyond providing software services by offering customizability and expandability features to meet a user's needs. For example, PaaS can provide a cloud based developmental platform for users to develop, modify, manage and/or customize applications and/or automate enterprise operations without maintaining network infrastructure and/or allocating computing resources normally associated with these functions.

Within the context of cloud computing solutions, users may be asked to deal with ever increasing amounts of collected data. The amount of data collected in today's cloud computing solutions may be orders of magnitude greater than was historically available. Users tasked with automating enterprise, IT, and/or other organization-related functions (e.g., incident tracking in a help desk context) may need to navigate the ever increasing amounts of data to properly and efficiently perform their job functions while providing robust data security and privacy capabilities. For instance, being able to search and query results from fields stored in tables and/or documents relevant to a user can be beneficial for efficiently managing data stored within a cloud computing environment. However, some data within a cloud computing environment may be sensitive or confidential information that an enterprise desires to restrict access to. As a result, continually improving a user's ability to perform queries that address at least these and/or other issues relating to managing, utilizing, and controlling access to potentially large data sets remains valuable in enhancing cloud computing services.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed below.

In one embodiment, a system that searches encrypted data within a cloud computing environment. The system is able to configure a first encryption context that allows access to a first encrypted field and configure a second encryption context that allows access to a second encrypted field. To implement role-based encryption, the system assigns the first encryption context to a first role and the second encryption context to a second role. Additionally, the system assigns the first role to a first user account to allow the first user account to access the first encrypted field and assigns the second role to a second user account to allow the second user to access the second encrypted field. When the system receives a query request associated with the first user account for a search term, the system performs a search for an unencrypted version of the search term and a search for a first encrypted value of the search term that is based on the first encryption context.

In another embodiment, a method that searches encrypted data within a cloud computing environment. Prior to performing a search, the method configures a first encryption context that allows access to a first encrypted field and configures a second encryption context that allows access to a second encrypted field. The method also assigns the first encryption context to a first role and the second encryption context to a second role. The method then assigns the first role to a first user account to allow the first user account to access the first encrypted field, assigning the second role to a second user account to allow the second user to access the second encrypted field. Once the method receives a query request associated with the first user account for a search term, the method performs a search for an unencrypted version of the search term and a first encrypted value of the search term that is based on the first encryption context.

In yet another embodiment, a system comprising a non-transitory memory and one or more hardware processors configured to read instructions from the non-transitory memory that causes the system to perform the following operations: configure a first encryption context that allows access to at least a first encrypted field, configure a second encryption context that allows access to at least a second encrypted field, assign the first encryption context to a first role and the second encryption context to a second role, assign the first role to a first user account to allow the first user account to access at least the first encrypted field, assign the second role to a second user account to allow the second user to access at least the second encrypted field, wherein the first user account is not assigned to the second role, receive a query request associated with the first user account for a search term, wherein the query request includes instructions to search for an unencrypted version of the search term and a first encrypted value of the search term that is based on the first encryption context, wherein the query request does not include instructions to search for a second encrypted value of the search term based on the second encryption context and perform a search of the unencrypted version of the search term and the encrypted value of the search term.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 5 is an illustration of an embodiment of a user interface on a client device that allows a user to enter search terms and/or search strings for a query.

FIG. 6 is an illustration of an inverted index process that creates index tables for a customer instance to search through.

DESCRIPTION OF EMBODIMENTS

Figure 1:
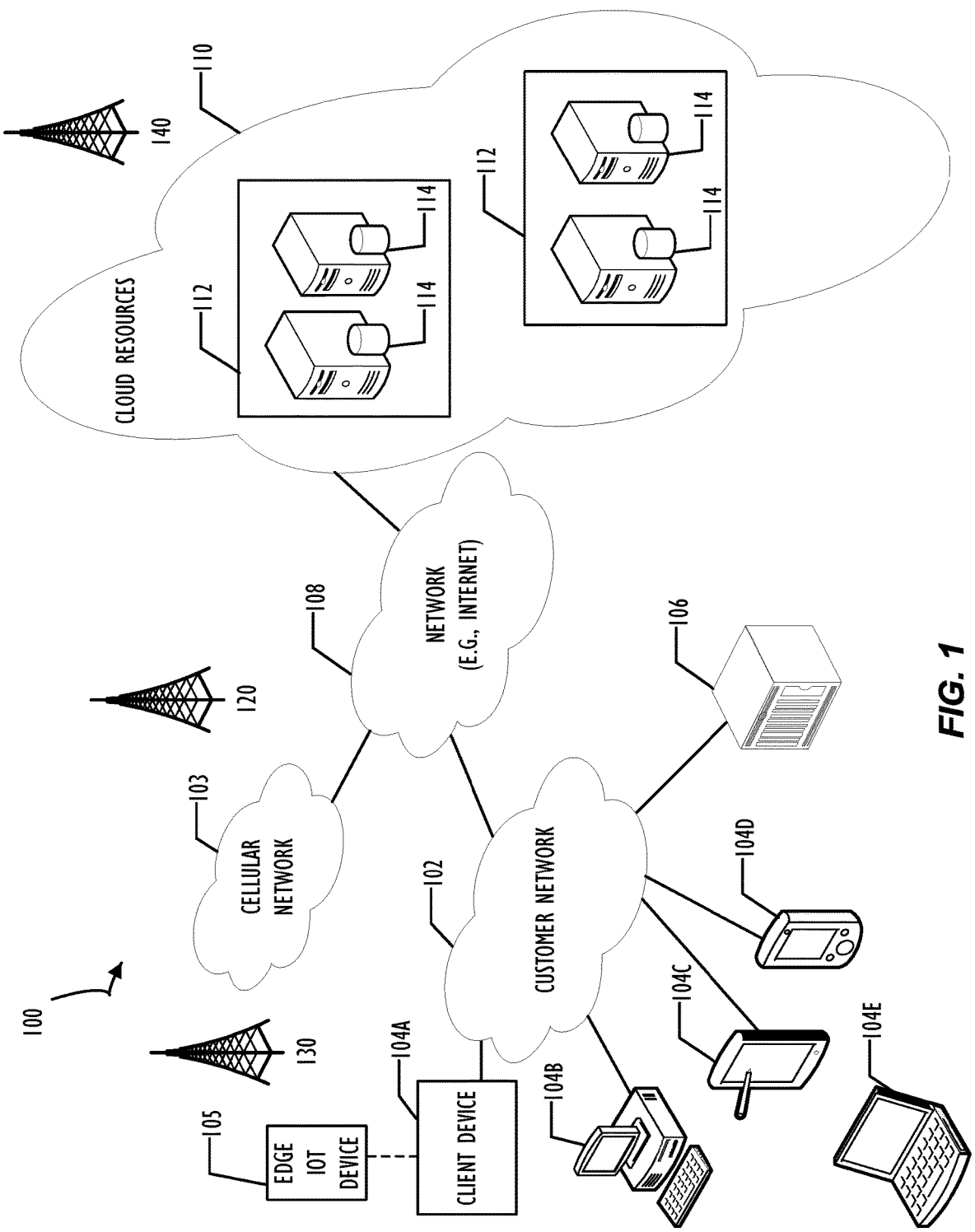
FIG. 1 illustrates a block diagram of an embodiment of a cloud computing system where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system. The term "medium" as use within this disclosure refers to one or more non-transitory physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

The terms "search" and "query" may be used interchangeably within this disclosure to refer to processing a set of data for matching results based on information (e.g., characters, strings, parameters, wildcards, and Boolean operators) provided as input. The set of data to search may be from any number of data stores including but not limited to, documents, text files, tables, knowledge bases, and relational databases. As an example, a search or query may be encoded using Structured Query Language (SQL). As used herein, the term "table" as used in this disclosure represents a database table, knowledge base, and/or other types of data stores that include a collection of records in a database, such as a configuration management database (CMDB).

As used herein, the term "encryption context" includes one or more encryption keys used by an encryption operation to encrypt data located within fields, documents, tables and/or other types of data stores. For example, an encryption context can encrypt data stored in text fields within the table, where the text fields may not be viewable and/or accessible without an encryption key associated with the encryption context. An encryption key may be setup using a variety of known encryption operations, such as Advanced Encryption Standard (AES) 128-bit or 256-bit and Triple Data Encryption Standard (DES). A single customer instance may include one or more encryption contexts, where each encryption context has a separate encryption key.

The term "role" refers to a category that can be assigned to one or more user profiles to can grant access to one or more particular parts of a system and/or stored data, such as encryption contexts. Once access has been granted to a role, users assigned to that role can be granted the same access. Roles can also contain other roles, where access granted to a specific role will also be granted to any roles that contain this specific role. As used herein, the term "use profile," "user account," and "user settings" can be interchangeable through this disclosure and refers to an electronic-digital representation of a user's identity created from user-specific and/or personal data. A user profile can define a user's working environment, such as display settings, security access, computing privileges, and/or ability to view sensitive data sets in a cloud computing environment (e.g., encryption context).

The disclosure includes various example embodiments that allow users to query and receive search results relating to encryption contexts. An administrator may be able to create encryption contexts to protect sensitive data from unauthorized access. To create an encryption context, the administrator may generate and assign at least one encryption key. After creating the encryption context, the administrator is able to assign one or more roles to the encryption context. Assigning roles to the encryption context grants the roles access to the specified encryption context to view encrypted data. For a user profile to have access to the encryption context, the administrator associates the user profile to one of the roles with access to the encryption context. After a user logins with the user profile, the user may initiate, using the client browser, a query request that includes one or more search terms (e.g., "brown" or "brown dog"). Because the user profile is associated with at least one role that grants the user profile access to an encryption context, the customer instance may perform a search for unencrypted versions of the search terms and/or a search for the encrypted values of the search terms. The customer instance may generate the encrypted values of the search terms based on encryption keys associated with each encryption context. After receiving the query request, the customer instance may then be able to perform a search not only using the unencrypted versions of the search terms, but also the encrypted values of the search terms. In one embodiment, the customer instance may search through one or more index tables to identify which documents, tables and/or other types of data stores in the database that have the searched search terms. In another embodiment, the customer instance may avoid utilizing index tables, and instead directly search encrypted data stored within tables, documents, and/or other types of data stores saved within the database that the user profile has access to.

FIG. 1 illustrates a block diagram of an embodiment of a cloud computing system 100 where embodiments of the present disclosure may operate. Cloud computing system 100 comprises a customer network 102, network 108, and a cloud resources platform/network 110. In one embodiment, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., Transmission Control Protocol (TCP)/Internet Protocol (IP)) and connection technologies (e.g., WiFi® networks (WI-FI is a registered trademark of the Wi-Fi Alliance), Bluetooth® (BLUETOOTH is a registered trademark of Bluetooth Special Interest Group)). In another embodiment, customer network 102 represents an enterprise network that could include or be communicatively coupled to one or more local area networks (LANs), virtual networks, data centers and/or other remote networks (e.g., 108, 110).

As shown in FIG. 1, customer network 102 may be connected to one or more client devices 104A-E and allow the client devices 104A-E to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing system 100 may also include other types of devices generally referred to as Internet of Things (IOT) (e.g., edge IOT device 105) that may be configured to send and receive information via a network to access cloud computing services or interact with a remote web browser application (e.g., to receive configuration information). FIG. 1 also illustrates that customer network 102 includes a local compute resource 106 that may include a server, access point, router, or other device configured to provide for local computational resources and/or facilitate communication amongst networks and devices. For example, local compute resource 106 may be one or more physical local hardware devices, such as a management, instrumentation, and discovery (MID) server that facilitates communication of data between customer network 102 and other networks such as network 108 and cloud resources platform/network 110. Local compute resource 106 may also facilitate communication between other external applications, data sources, and services, and customer network 102. Another example of a local compute resource 106 is a MID server Cloud computing system 100 also includes cellular network 103 for use with mobile communication devices. Mobile cellular networks support mobile phones and many other types of mobile devices such as laptops etc. Mobile devices in Cloud computing system 100 are illustrated as mobile phone 104D, laptop computer 104E, and tablet computer 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact other mobile devices or with non-mobile devices such as desktop computer 104B and various types of client device 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WAN), the Internet, and/or other remote networks, in order to transfer data between client devices 104A-D and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio based network as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via customer network 102 and network 108. The cloud resources platform/network 110 acts as a platform that provides additional computing resources to the client devices 104A-E and/or customer network 102. For example, by utilizing the cloud resources platform/network 110, users of client devices 104A-E may be able to build and execute applications, such as automated processes for various business, IT, and/or other organization-related functions. In one embodiment, the cloud resources platform/network 110 includes one or more data centers 112, where each data center 112 could correspond to a different geographic location. Within a particular data center 112, a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java® Virtual Machine), and/or a database server instance (e.g., a unitary MySQL® catalog (MySQL® is a registered trademark owned by MySQL AB A COMPANY)).

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances (not shown in FIG. 1) are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multi-tenant environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causes outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud resources platform/network 110, and customer-driven upgrade schedules. An example of implementing a customer instance within a multi-instance cloud architecture will be discussed in more detail below when describing FIG. 2.

In one embodiment, utilizing a multi-instance cloud architecture, a customer instance may be configured to communicate with a client side user interface, such as a web browser executing on a client device (e.g., one of client devices 104A-E of FIG. 1). In this example, a user that is logged-in using a specific user profile may interact with the user interface to request a search across one or more data stores (e.g., documents or tables) saved in the cloud resources platform/network 110. For example, the query request may include instructions to search for encrypted data matching a search string the user enters within the user interface. The search string may include, but is not limited to, one or more search terms (e.g. search term "brown" and search term "dog"), search operators (e.g., a Boolean operators and proximity operator), numeric data, and other symbols (e.g., wildcard character (asterisks), parentheses, quotation marks, question mark). As an example, a user may enter a search string that includes the phrase "apples NOT oranges" to represent a query for the search term "apples" and excludes search results that contain the search term "oranges." To improve searching capability, the customer instance is configured to not only search for unencrypted versions of the search terms, but also automatically generate and search encrypted values of the search terms.

The number of encrypted values for each search term depends on the number of encryption contexts the user profile has access to. For example, a user profile may be assigned to two different roles, role A and role B. Role A allows the user profile to access encryption context A and role B allows the user profile to access encryption context B. The user profile may not have access to other encryption contexts, such as encryption contexts C and D. When a user enters a search term within a search field, because the user profile is associated with two different encryption contexts, the generated query may automatically create two encrypted values for the search term, where one of the encrypted values is based on encryption context A and the other is based on encryption context B. Equation 1, presented below, represents an expression for a query of a specific search term with a user profile that has access to both encryption contexts A and B:

$$\text{Query} = \text{search term 1 OR Context A (search term 1)} \\ \text{OR Context B (search term 1)} \quad (1)$$

As shown above in equation 1, the query will include a search for the unencrypted version of search term 1 (e.g., "brown"), a search for an encrypted value of search term 1 based on encryption context A (e.g., "A%^1wz") and a search for an encrypted value of search term 1 based on encryption context B (e.g., "B#@qrP"). A client device or customer instance may generate the encryption values of search term 1 using the encryption key associated with each of the encryption context. The query could also include similar search instructions for each additional search term (e.g., "dog") a user enters into the search field. Afterwards, the customer instance would return query results that match any of the unencrypted version of search term 1, the encrypted value of search term 1 based on encryption context A, or the encrypted value of search term 1 based on encryption context B. For instance, the customer instance may return the search results back to the client device 104 to display (e.g., display on web browser) for a user to view. The relationship between user profiles, roles, and encryption contexts are discussed in more detail with respect to FIGS. 5 and 6.

In some instances, a user may customize a query to selectively search using one or more encryption contexts that the user profile has access too. In other words, a user may be able to select which encrypted values to use when generating a query request to search encrypted data. Continuing with the example discussed in the previous paragraph, the user may generate a query request that excludes searching using encryption context B even though the user profile has access to encryption context B. For example, when the user initiates a query request for search terms (e.g., enter unencrypted version of the search terms in a search field), the user may customize the query to include a search for the unencrypted search term 1 (e.g., "brown") and a search for an encrypted value of search term 1 based on encryption context A (e.g., "A%^1wz"). Allowing a user to selectively search using different encryption contexts may beneficial in assisting the user in navigating through vast amounts of data and providing search results that are of interest to a user. Example embodiments of how a user interface can customize queries to search encryption contexts are discussed in more detail with respect to FIG. 7.

In one or more embodiments, a customer instance may be configured to generate index tables that index unencrypted data and/or encrypted data saved in one or more data stores located in the cloud resources platform/network 110. When the customer instance receives a query request, rather than directly searching through the actual data stores, the customer instance searches the index tables with the unencrypted version of the search terms and/or selected encrypted values of the search terms. As an example, the customer instance may generate inverted index tables that store the mapping from data content to its locations in a data store, such as a specific table, document, or database file. In one embodiment, the inverted index table may be an inverted file index that contains a list that identifies the relevant data stores that contain each of the search terms. In another embodiment, the inverted index table could be full inverted indexes that also includes the position of search terms within the data store. Utilizing inverted index tables may allow the customer instance to perform full text searches while minimizing processing power and improving lookup speed. Other embodiments of the customer instance may utilize other types of indexing data structures that are known in the art, such as a forward index. Afterwards, the customer instance returns search results from the index table back to the client device 104.

In another embodiment, the customer instance may be configured to perform a query that directly searches the actual data stores. When the customer instance receives the query request, rather than searching through index tables, the customer instance is able to search the data stores (e.g., table) with the unencrypted versions of the search terms and/or encrypted values of the search terms associated with the user profile. For example, the customer instance may be able to perform a search for data located within unencrypted table fields using the unencrypted version of the search terms and search data located in encrypted table fields using the applicable encryption contexts. To distinguish between unencrypted table fields from encrypted table fields an administrator may configure the encrypted table fields as an encrypted text type to identify that the table field includes encrypted data. Based on the search results with the unencrypted and encrypted values of the search terms, the customer instance is able to return location information and/or relevant data from the corresponding tables, documents, or other types of data stores.

Figure 2:
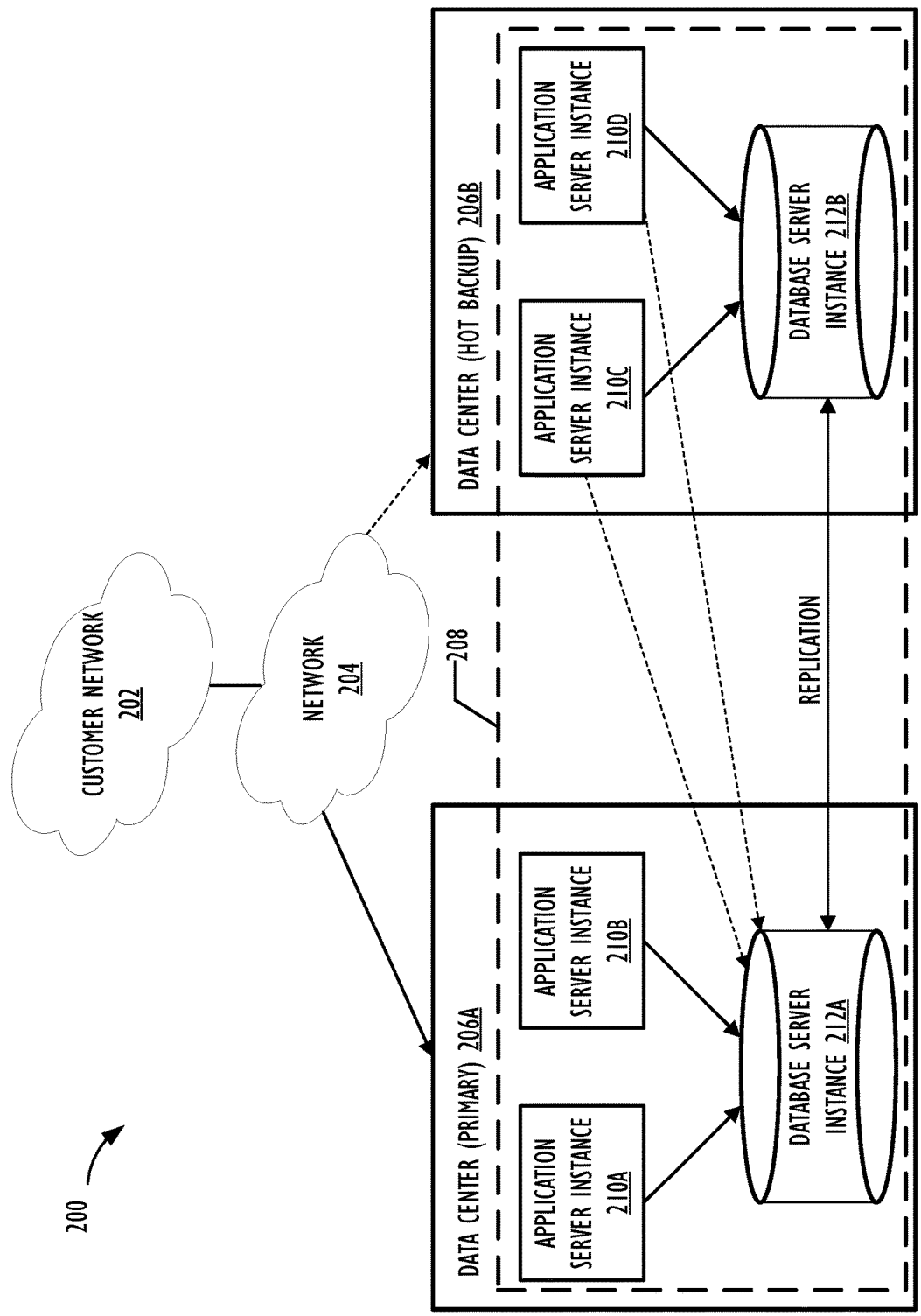
FIG. 2 illustrates a block diagram of an embodiment of a multi-instance cloud architecture where embodiments of the present disclosure may operate.

FIG. 2 illustrates a block diagram of an embodiment of a multi-instance cloud architecture 200 where embodiments of the present disclosure may operate. FIG. 2 illustrates that the multi-instance cloud architecture 200 includes a customer network 202 that connects two data centers 206a and 206b via network 204. Customer network 202 and network 204 may be substantially similar to customer network 102 and network 108 as described in FIG. 1, respectively. Data centers 206a and 206b can correspond to FIG. 1's data centers 112 located within cloud resources platform/network 110. Using FIC 2 as an example, a customer instance 208 is composed of four dedicated application server instances 210a-210d and two dedicated database server instances 212a and 212b Stated another way, the application server instances 210a-210d and database server instances 212a and 212b are not shared with other customer instances 208. Other embodiments of the multi-instance cloud architecture 200 could include other types of dedicated server instances, such as a web server instance. For example, the customer instance 208 could include the four dedicated application server instances 210a-210d, two dedicated database server instances 212a and 212b, and four dedicated web server instances (not shown in FIG. 2).

To facilitate higher availability of the customer instance 208, application server instances 210a-210d and database server instances 212a and 212b are shown to be allocated to two different data centers 206a and 206b, where one of data centers 206 may act as a backup data center, in reference to FIG. 2, data center 206a acts as a primary data center that includes a primary pair of application server instances 210a and 210b and primary database server instance 2l2a for customer instance 208, and data center 206b acts as a secondary data center to back up primary data center 206a for a customer instance 208. To back tip primary data center 206a for customer instance 208, secondary data center 206 includes a secondary pair of application server instances 210c and 210d and a secondary database server instance 212b. Primary database server instance 212a is able to replicate data to secondary database server instance 212b. As shown in FIG. 2, primary database server instance 212a replicates data to secondary database server instance 212b using a replication operation such as, for example, a Master-Master MySQL® Binlog replication operation. The replication of data between data centers could be implemented in real time or by implementing full backup weekly and daily incremental backups in both data centers 206a and 206b Having both a primary data center 206a and secondary data center 206b allows data traffic that typically travels to the primary data center 206a for the customer instance 208 to be diverted to the second data center 206b during a failure and/or maintenance scenario. Using FIG. 2 as an example, if application server instances 210a and 210b and/or primary data server instance 212a fails and/or is under maintenance, data traffic for customer instances 208 can be diverted to secondary application server instances 210c and 210d and secondary database server instance 212b for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only examples to facilitate ease of description and explanation.

Figure 3:
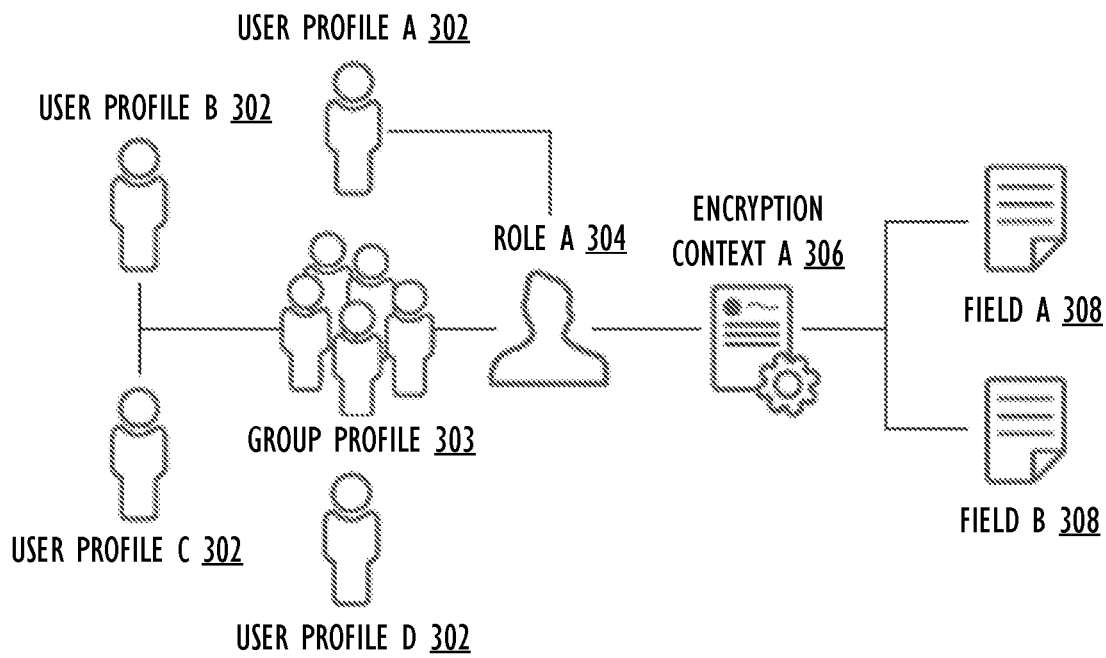
FIG. 3 is an illustration of an example of enabling role-based encryption using user profiles, roles, and encryption contexts.

FIG. 3 is an illustration of an example of enabling role-based encryption using user profiles 302, roles 304, and encryption contexts 306. In FIG. 3, user profile A 302 is a member of role A 304, which provides access to encryption context A 306. By associating the user profile A 302 with role A 304, user profile A 302 has access and can view encrypted data from fields A and B 308. FIG. 3 also illustrates that user profile B 302 and user profile C 302 are members of group profile 303, and group profile 303 is a member of role A 304. Having group profile 303 be a member of role A 304 allows every user profile in group profile 303 have access to encryption context A 306. Having access to encryption context A 306 allows user profile A 302 and user profile B 302 to access encrypted data within fields A and B 308. User profile D 302 is not a member of any group profile 303 or role 06 and because of this user profile D 302 does not have access to encryption context A 306. This prevents user profile D 302 from accessing and/or viewing that fields A and B 308 exists.

Figure 4:
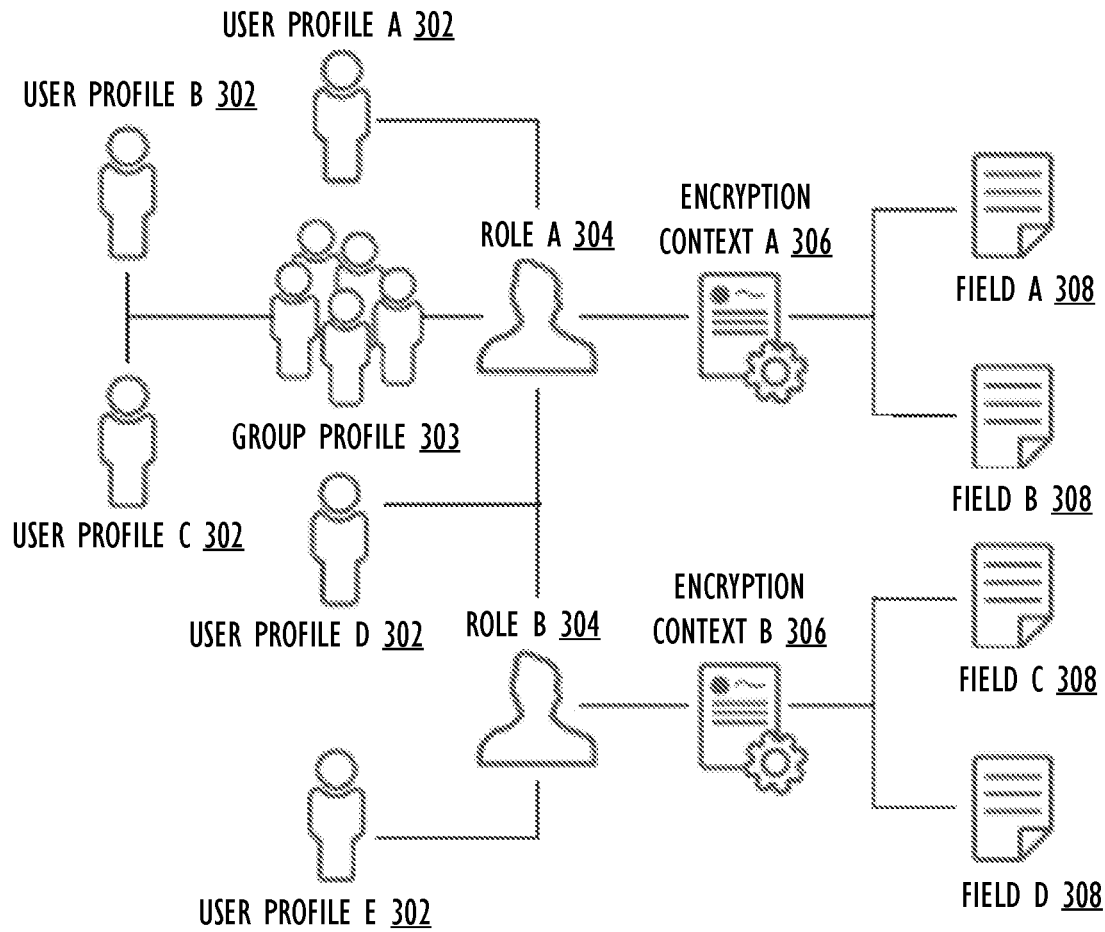
FIG. 4 is an illustration of another example of enabling role-based encryption using user profiles, roles, and encryption contexts.

FIG. 4 is an illustration of another example of enabling role-based encryption using user profiles 302, roles 304, and encryption contexts 306. User profiles A-C 302 have the same relationship between role A 304, encryption context A 306 and fields A and B 308 as described for FIG. 3. User profile D 302 is now a member of roles A and B 308, which have access to encryption context A and B 306, respectively. Based on being able to access encryption context A and B 306, user profile D 302 is able to access fields A-D 308. User profile E 302 is able to access encryption context B 306 via role b 308, which then allows user profile E 302 to access fields C and D.

Figures 5, 6:
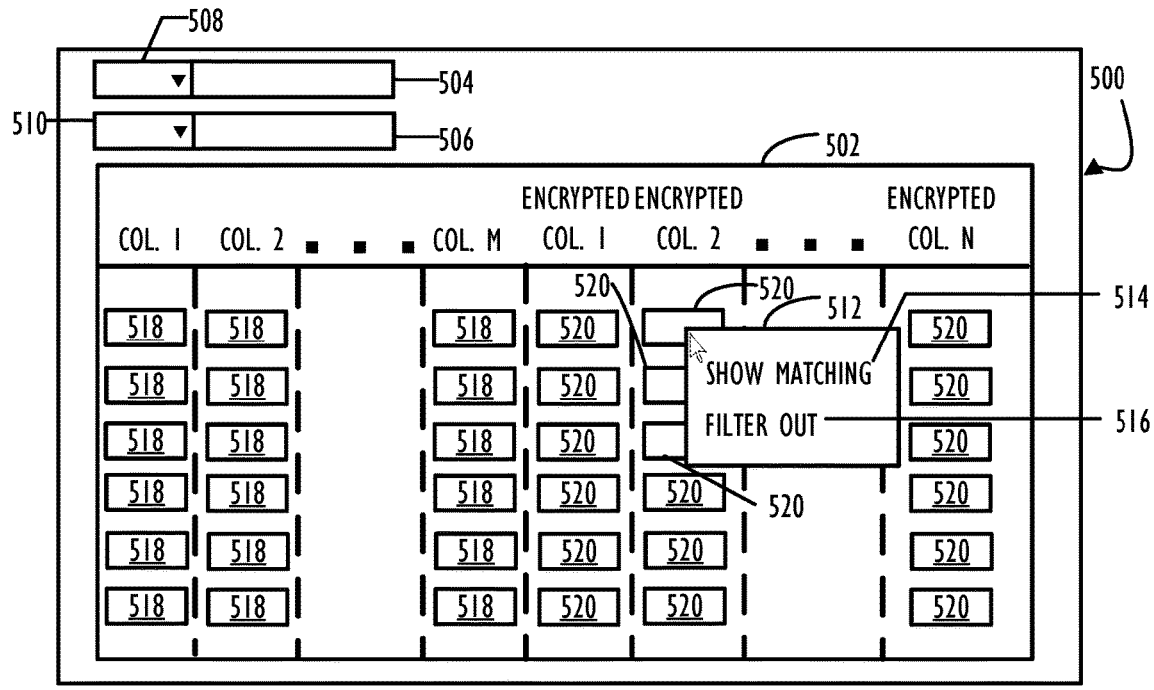

FIG. 5 is an illustration of an embodiment of a user interface 500 on a client device that allows a user to enter search terms and/or search strings for a query. As an example, the user interface 500 may be a web browser that interfaces with a customer instance implemented within a cloud computing environment. As shown in FIG. 5, the user interface 500 may display a table 502 that includes unencrypted columns 1-M and encrypted columns 1-N. Underneath unencrypted columns 1-M include unencrypted text data 518 stored within table 502, and underneath encrypted columns 1-N include encrypted text data 520 that user profile is able to access based on the roles mapped to the user profile. Stated another way, the user profile that is currently utilizing user interface 500 may have been granted access to encryption contexts that correspond to the displayed encrypted columns 1-N. Table 502 may also include other encrypted columns (not shown in FIG. 5) that correspond to encryption contexts the user profile does not have access to.

Prior to a user accessing the user interface 500, an administrator may grant access to one or more encryption contexts to a user profile. Each encryption context is associated with an encryption key that may be generated and/or saved at the customer instance and/or client device to allow access to the encryption context. For example, a user can generate the encryption key with a private certificate authority or setup an encryption key through the customer instance. In one embodiment, the encryption key may also be encrypted with a local key that is stored within the client device rather in the cloud computing environment. Encrypting with a local key may prevent other users from copying and using the encryption key to decrypt data. The administrator is then able to assign roles to different encryption contexts. Assigning roles to the encryption context grants the roles access to that specified encryption context. For a user profile to have access the encryption context, the administrator associates the user profile to roles with access to the different encryption contexts.

FIG. 5 also illustrates that a user is able to generate a query to search one or more search terms by right clicking on encrypted text data 520 (e.g., the search term "secrete 1") within a column of table 502 to generate window 512. The encrypted text data 520 is displayed to a user as its unencrypted version rather than its encrypted value. For example, the encrypted text data 520 is displayed as the text "secrete 1" rather than the encrypted version of "secrete 1," which could be "A%^1wz." Within window 512, the user interface 500 may provide one or more options to search encrypted data. In FIG. 5, the window 512 present a "show matching" option 514 and a "filter out" option 516 for a user to select from to generate a query request. If a user selects the "show matching" option 514, the "show matching" option 514 may create a query to return data results within encrypted column 2 that matches the encrypted value of the selected text data 520 (e.g., "A%^1wz"). If a user selects the "filter out" option 516, the "filter out" option 516 may create a query that filters out data results within encrypted column 2 that match the encrypted value of the selected text data 520 (e.g., "A%^1wz"). Other embodiments of the "show matching" option 514 and "filter out" option 516 may not limit the query to searching specific columns within table 502, but instead may search multiple columns within table 502, the entire table 502, and/or other data stores.

User interface 500 illustrates that a user may initiate a query request by entering search strings into one or more search fields. In FIG. 5, the user is able to input unencrypted versions of the search terms within search field 504 to return results corresponding to the entered search terms. The search field 504 may include a search field type 508 that sets the scope of the search. For example, a user may set the search field type 508 to search terms entered in search field 504 to a specific column in table 502 (e.g., encrypted column 1), a group of columns in table 502, the entire table 502, and/or other data stores. The second search field 506 may be configured to allow users to enter more sophisticated search strings that include Boolean and/or other symbol operations. FIG. 5 also illustrates another search field type 510 used to set the scope of the search similar to the search field type 508. As an example, in this instance the search field type 510 may be set to search all of the columns within table 502. In FIG. 5, the search field types 508 and 510 are implemented as drop down menus to allow a user to quickly select the search scope. Although FIG. 5 illustrates the user interface 500 contains multiple search fields 504 and 506 and a drop down menu for entering search field types 508 and 510, other embodiments of user interface 500 may vary the number of search fields 504 and 506 and how the user interface allows a user to enter search field types 508 and 510.

In one embodiment, once a user enters or selects the unencrypted versions of the search terms and/or search strings, the client device may generate a query request to perform the search. In instances when a user designates to search selected encrypted columns within table 502, the query may generate and/or provide instructions to search encrypted text values based on the corresponding encrypted context and may not include a search with the unencrypted text value. When the user selects to search both unencrypted columns and encrypted columns in table 502, the query may generate and/or provide instructions to search using the encrypted text value based on the corresponding encrypted context and the unencrypted text value. A search engine within a customer instance may perform a search using the unencrypted text value for unencrypted columns and a search using the encrypted text values based on the corresponding encrypted contexts for the encrypted columns in table 502. In other embodiments, rather than searching the stored contexts of table 502 within the database, the search engine may search index tables to identify the locations of entered search terms and/or character strings. The search engine is discussed in more detail in relation to FIGS. 7-9.

FIG. 6 is an illustration of an inverted index process 600 that creates index tables for a customer instance to search through. FIG. 6 illustrates that the data store 602 includes columns 608, 610, and 612. Column 608 includes document identifier information to identify different documents, which have been labeled 1-6 in FIG. 6 for ease of description. Column 610 includes unencrypted text stored within each of the documents, and column 612 contains encrypted text that corresponds to a specific encryption context. Using FIG. 6 as an example, based on data store 602, document 1 would include the data content "my laptop does not work" and the encrypted data "4FB^&*WI" The encrypted data (e.g., "4FB^&*WI") within column 612 represents encrypted versions of a search term encoded using an encryption key corresponding to the specific encryption context. In FIG. 6, the inverted index process 600 creates two index tables 604 and 606 to store the mapping of the data store's 602 content in columns 610 and 612 to its corresponding documents (e.g., document identifier information in column 608).

To implement mapping between the data content in data store 602 and location of the data content, the mapping process creates the index table 604 to map specific search terms found within column 616 to specific term identifiers found within column 614. As an example, search term "laptop" in column 616 has been mapped to term identifier 1 in column 614. The search terms in column 616 are terms found within data store 602. Index table 606 maps column 618, which also includes term identifiers similar to column 614, to column 620, where the data under column 620 represents document identifiers. For example, in index table 606, a search term assigned with a term identifier of 7 can be found within documents 3 and 4. FIG. 6 also illustrates that index table 604 assigns term identifiers to encrypted values of search terms found within column 612 of the data store 602. Having index table 604 map the encrypted values of the search term prevents the customer instance from decrypting the entire data store 602 prior to performing a search.

When a customer instance receives a query that contains the unencrypted search terms "email" and "server," a customer instance may initially utilize index table 604 to determine a term identifier for each of the search terms "email" and "server." Using index table 604 as an example, the customer instance may determine that the search terms "email" and "server" map to term identifiers 4 and 7, respectively. Additionally or alternatively, the query may also contain and/or request the customer instance to search encrypted values of the search terms "email" and "server" since the user profile may have access to at least one encryption context. Continue using index table 604 as an example, the encrypted value of "server" could be "4FB^&*WI" and the encrypted value of "email" could be "A%^1WZ." Based on the encrypted values of "email" and "server," encrypted values "4FB^&*WI" and "A%^1WZ" would map to term identifiers 13 and 14, respectively. Determining that the query corresponds to term identifiers 4, 5, 13, and 14, a customer instance is able to identify using index table 606 the document identifier information, which in this case would correspond to documents 1-4.

Although FIG. 6 illustrate specific embodiments of index tables 604 and 606, the disclosure is not limited to the specific embodiments illustrated in FIG. 6. For instance, more than two index tables with different a variety of different information may be used to manage larger data stores with different organizational structures. Moreover, other embodiments of the present disclosure may implement a full inverted index that include position information of the search term instead of just containing a list that identifiers the different data stores (e.g., documents) that contains each search term. In yet other embodiments, other indexing operations, such as a forward indexing, can be used to implement the mapping process. The use and discussion of FIG. 6 is only a simplified example to facilitate ease of description and explanation of utilizing index tables.

Figure 7:
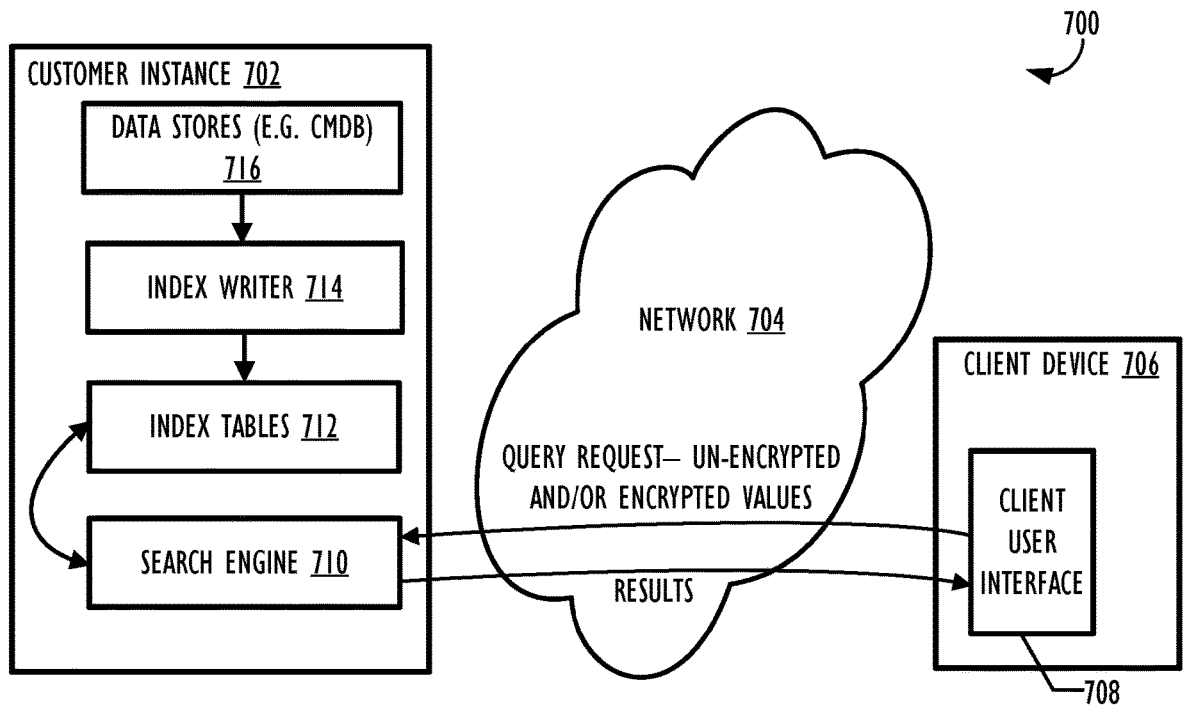
FIG. 7 is a block diagram of an embodiment a network environment for performing queries of encrypted data within data stores utilizing index tables.

FIG. 7 is a block diagram of an embodiment a network environment 700 for performing queries of encrypted data within data stores utilizing index tables. In FIG. 7, the client device 706 initiates a query request using a client user interface 708 that may be similar to the user interface shown in FIG. 5. Recall that one way to generate the query request is to have a user select a search scope and enter a search string into a search field. The search terms entered within the search string are generally unencrypted versions of the search terms (e.g., "brown"). In other words, the user does not enter encrypted versions of the search terms and instead relies on the client device 706 and/or customer instance 702 to automatically generate encrypted values of the search terms based on encryption contexts the user profile has access to. Based on the determined search scope, the client device 706 generates a query request, such as a SQL query, and transmits the query request via network 704 to the customer instance 702.

In embodiments where the encryption keys for one or more encryption contexts are stored within the client device 706, the client device 706 may generate a query request that includes both the unencrypted and/or encrypted values of search terms within the search string. Alternatively, if the encryption keys for the encryption contexts are stored within the customer instance 702, the query request may not include the encrypted values of the search term and instead include user profile information and/or other instructions for the customer instance 702 to determine what encryption contexts the user profile is able to access. When generating encrypted values for corresponding encryption contexts, the client device 706 or customer instance 702 may generate encryption values for each unencrypted search term within a search string. For example, if the search string includes two search terms "brown" and "dog" the client device 706 may generate two distinct encryption values, one for "brown" and one for "dog." Additionally or alternatively, the client device 706 may generate an encryption value for multiple search terms. Using the "brown dog" example, the client device 706 may also generate an encryption value for the entire search phrase "brown dog."

Once the search engine 710 receives the query request, the search engine 710 may then tokenize the search string to separate out each search term and/or generate encrypted values for each search term within the query request. For embodiments where the encryption keys for the encryption contexts are stored within the customer instance 702, the search engine 710 may not tokenize the encrypted values, but instead generate encrypted values for each of tokenized search term. Once separating out each of the search terms and/or determining the encrypted values for the search terms, the search engine 710 may perform lookup operations using the index tables 712 with the search terms and/or encrypted values. The search engine 710 may also determine whether the search string includes specific searching operations, such as Boolean operations or wildcard symbols that may affect the search results. After receiving the location information from the index tables 712, the search engine 710 may update the search results with the determined searching operations. The search engine 710 may then send the updated search results back to the client device 706.

FIG. 7 also illustrates that the index tables 712 may be created using an index writer 714. The index writer 714 may receive updates as data within data stores 716 updates or changes over time. Each time the data stores 716 updates, information related to the updates can be sent to the index writer 714 to update information within the index tables. In one embodiment, the index writer 714 may perform incremental update that revises the rows within the index tables 712 that correspond to updates in the data stores 716. Additionally or alternative, the index writer 714 may implement a full re-indexing operation that updates all of the index tables 712. As an example, the index writer 714 may implement a full re-indexing operation when an encryption key change occurs for one or more encryption contexts.

Figure 8:
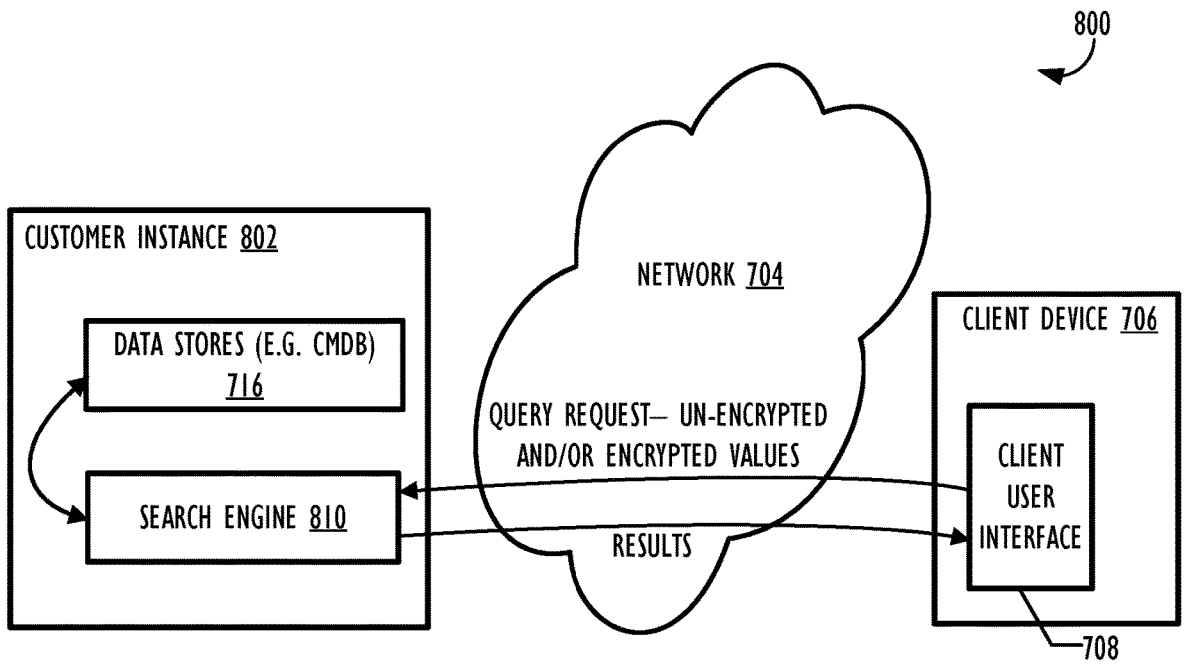
FIG. 8 is a block diagram of an embodiment a network environment for searching encrypted contexts directly within the data stores.

FIG. 8 is a block diagram of an embodiment a network environment 800 for searching encrypted contexts directly within the data stores. In FIG. 8, rather than then the search engine 810 search index tables 712 shown in FIG. 7, the search engine 810 within customer instance 802 may directly searches the data stores 716 to determine the location and/or position information of the search terms. Using FIG. 6 as an example, when search engine 810 receives a query request to search data store 602, the search engine 810 would use the unencrypted search terms to search column 610 and encrypted search terms to search column 612. The search engine 810 would determine the location information of the search terms based on the document identifier information shown in column 608. Performing a direct search of the data stores 716 may be beneficial in situations where the query request involves a specific table and/or a limited number of tables. Although FIGS. 7 and 8 illustrates that the search engines 710 and 810 may search either using index tables 712 or directly with the data stores 716, other embodiments of customer instances 702 and 802 may be configured to implement both type of searches, where searching using the index tables may be performed for certain type of query requests and a direct search of the data stores 716 for other types of query requests.

Figure 9:
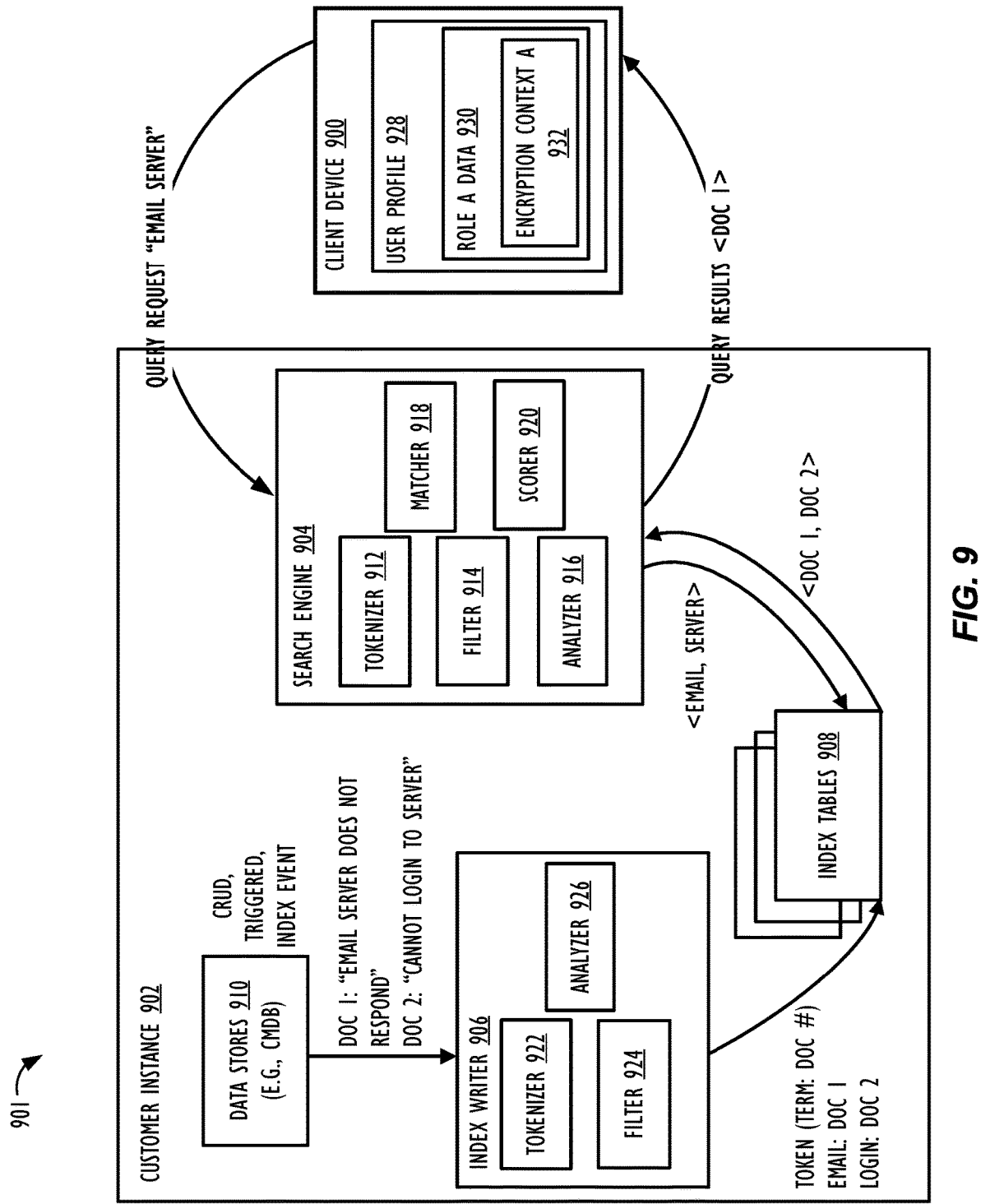
FIG. 9 is a block diagram of an embodiment a network environment for performing queries for encrypted data within data stores utilizing index tables.

FIG. 9 is a block diagram of an embodiment a network environment 901 for performing queries for encrypted data within data stores utilizing index tables. The network environment 901 is similar to the network environment 700 shown in FIG. 7, except that FIG. 9 provides more detail relating to the client device 900, search engine 904, and index writer 906. Specifically, FIG. 9 illustrates the different components can be found in search engine 904 and index writer 906. For the client device 900, FIG. 9 depicts that the client device 900 may contain a user profile 928 that is associated with a role A 930 that grants access to encryption context A 932. Based on role A 930 and the encryption context A 932, when the client device performs a query request, the query request may contain and/or request for a search of encrypted values of search terms that are based on the encryption context A 932. In particular, the client device 900 or customer instance 902 may generate the encrypted values for the search terms using one or more encryption keys associated with encryption context A 932. The index tables 908 and data stores 910 may be substantially similar to the index tables 712 and data stores 716 shown in FIG. 7, respectively.

FIG. 9 illustrates that the search engine 904 includes a tokenizer 912, filter 914, analyzer 916, matcher 918, and a scorer 920. When the search engine 904 receives a search string associated with a query request, the tokenizer 912 may separate out the search string by generating a list of tokens, where each token includes a search term within the query request and position information indicating where the token is located within the search string. The filter 914 may filters out one or more tokens to determine relevant search terms. For example, filter 914 may filter out search operations, such as Boolean operations and/or wildcard characters. Afterwards the tokens are then passed to an analyzer 916 to perform additional filtering and tokenization operations. For example, the analyzer 916 may perform transform the tokens to lowercase text, substituting words (e.g., misspelled words), removing common stop words, such as "the," "and," and removing punctuation. The matcher 918 and scorer 920 may be used to determine what results to return after receiving search results from index tables 908. Specifically, the matcher 918 and scorer 920 may be used to determine how well the search results match the query request.

In FIG. 9, the index writer 906 in FIG. 9 includes a tokenizer 922, filter 924, and analyzer 926. The tokenizer 922 may perform similar operations as tokenizer 912 except that tokenizer 922 may be configured to separate data received from data stores 910. Filter 924 may perform tokenized filter operation to filter out tokens that are not relevant to the indexing process. The analyzer 926 may perform additional filter and tokenization operations prior to sending updated information to the index tables 908. As shown in FIG. 9, the index writer 906 may update the index tables 908 when create, read, update and delete (CRUD) operations occur and/or triggered, index event occurs. Recall that the index writer 906 may update the index tables incrementally, for example, only updating the rows that have encrypted text within them or trigger a full text re-indexing operation.

Using FIG. 9 as a user case, the index writer 906 may receive data from the data stores 910 indicating that document 1 has be updated with the text "email server does not respond" and document 2 has been updated with the text "cannot login to server." After processing the data, the index writer 906 may update the index tables that the term email can be found in document 1 and the term login can be found in document 2. No additional changes need to be made to the index tables 908. Afterwards, a client device may generate a query request for the search string "Email Server." With reference to FIG. 5, a user may generate the query request using a variety of search options available within a user interface 500. In one embodiment, if the client device 900 has a version of the encryption key associated with encryption context A, the query request may also include encrypted versions of the search terms "email" and "server." Alternatively, if the client device 900 does not have a version of the encryption key, then customer instance 902 may generate the encryption version of the search terms. The search engine 904 receives the query request and subsequently passes the separated search terms "email" and "server" to perform a look up at index tables 908. After performing the lookup, the index tables 908 return to the search engine 904 that the terms "email" and "server" are found in documents 1 and 2 of the data store 910. The search engine 904 may return results to the client device 900 that the only document that contains the phrase "email server" is document 1. Although document 2 includes the search term "server," document 2 does not include the search term "email," and thus search engine 904 does not pass document 2 as part of the query result to client device 900.

Figure 10:
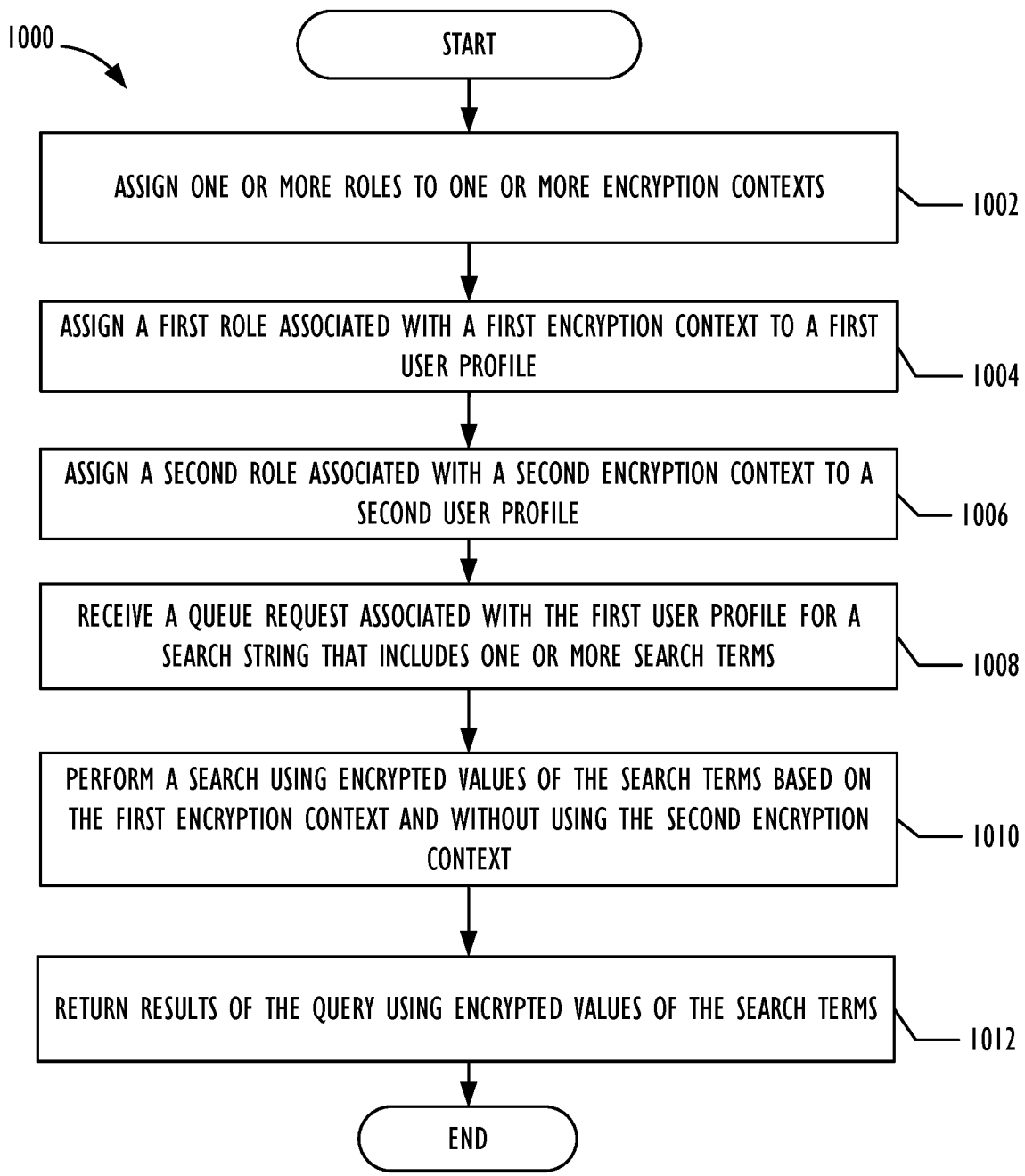
FIG. 10 is a flowchart of an embodiment of method that queries for encrypted data using an encrypted context.

FIG. 10 is a flowchart of an embodiment of method 1000 that queries for encrypted data using an encrypted context. Method 1000 may perform queries using hardware, software, or both. Using FIG. 7 as an example, method 1000 may be implemented using the network environment 700, where the client device 706 generates a query request and the customer instance 702 performs a search based on the query request and user profile settings. Although FIG. 10 illustrates that the blocks of method 1000 are implemented in a sequential operation, other embodiments of method 1000 may have one or more blocks implemented in parallel operations. For example, blocks 1002, 1004, and 1006 may be implemented in a parallel operation and may not be limited to a sequential operation.

Method 1000 may start at block 1002 to assign or more roles to one or more encryption contexts. By doing, method 1000 has granted the roles access to encryption contexts. Method 1000 may then move to block 1004 and assign a first role associated with a first encryption context to a first user profile. In one embodiment, method 1000 may assign specific roles to certain user profiles based on the type of tasks the user using the user profile may perform. For example, if the user is within a legal department of an enterprise, the method 1000 may assign suitable roles to the user profile that allow a user to perform his or her duties, such as accessing privileged and sensitive data that a user in some other department (e.g., human resource department) may not need to access. Once method 1000 completes this assignment, the first user profile is now able to access the first encryption context. Method 1000 may continue to block 1006 and assign a second role associated with a second encryption context to a second user profile. Based on these two assignments, the first user profile may be access certain encryption fields and/or data that the second user profile may not able to access and vice versa.

At block 1008, method 1000 receives a query request associated with the first user profile for a search string that includes one or more search terms. In one embodiment, the query request may include not only the unencrypted versions of the search terms, but also generated encrypted versions of the search terms based on the first encryption context. In another embodiment, the query request may include the unencrypted version of the search terms, and method 1000 may generated the encrypted values of the search term after receiving the query request based on user profile information and/or instructions within the query request. Method 1000 may then move to block 1010 and perform a searching using the encrypted values of the search terms based on the first encryption context and without using the second encryption context. In this instance, because the first user profile has not been assigned the second role, the first user profile does not have access to the second encryption context. In one embodiment, method 1000 may perform search one or more index tables. In another embodiment, method 1000 may directly search the data store. Afterwards, method 1000 may move to block 1012 and return results of the query request using the encrypted values of the search terms.

Figure 11:
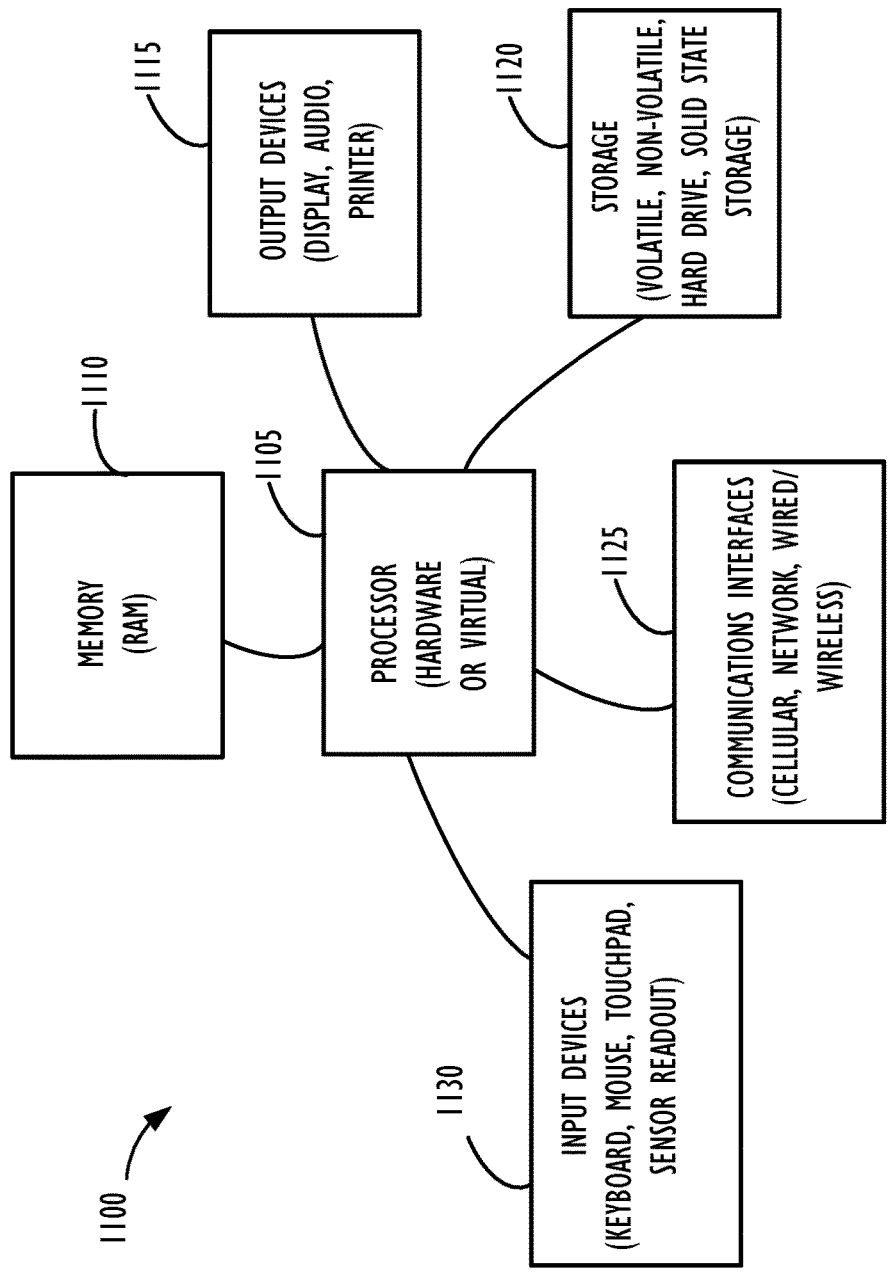
FIG. 11 is a block diagram illustrating another embodiment of a computing device for use with techniques described herein.

FIG. 11 illustrates a block diagram of a computing device 1100 that may be used to implement one or more disclosed embodiments (e.g., cloud computing system 100, client devices 104A-104E, data centers 206A-B, etc.). For example, computing device 1100 illustrated in FIG. 11 could represent a client device or a physical server device and include either hardware or virtual processor(s) depending on the level of abstraction of the computing device. In some instances (without abstraction) computing device 1100 and its elements as shown in FIG. 11 each relate to physical hardware and in some instances one, more, or all of the elements could be implemented using emulators or virtual machines as levels of abstraction. In any case, no matter how many levels of abstraction away from the physical hardware, computing device 1100 at its lowest level may be implemented on physical hardware. As also shown in FIG. 11, computing device 1100 may include one or more input devices 1130, such as a keyboard, mouse, touchpad, or sensor readout (e.g., biometric scanner) and one or more output devices 1117, such as displays, speakers for audio, or printers. Some devices may be configured as input/output devices also (e.g., a network interface or touchscreen display). Computing device 1100 may also include communications interfaces 1125, such as a network communication unit that could include a wired communication component and/or a wireless communications component, which may be communicatively coupled to processor 1105. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 11, computing device 1100 includes a processing element such as processor 1105 that contains one or more hardware processors, where each hardware processor may have a single or multiple processor cores. In one embodiment, the processor 1105 may include at least one shared cache that stores data (e.g., computing instructions) that are utilized by one or more other components of processor 1105. For example, the shared cache may be a locally cached data stored in a memory for faster access by components of the processing elements that make up processor 1105. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 11, the processing elements that make up processor 1105 may also include one or more other types of hardware processing components, such as graphics processing units (GPU), application specific integrated circuits (ASICs), field-programmable gate arrays (FPGAs), and/or digital signal processors (DSPs).

FIG. 11 illustrates that memory 1110 may be operatively and communicatively coupled to processor 1105. Memory 1110 may be a non-transitory medium configured to store various types of data. For example, memory 1110 may include one or more storage devices 1120 that comprise a non-volatile storage device and/or volatile memory. Volatile memory, such as random access memory (RAM), can be any suitable non-permanent storage device. The non-volatile storage devices 1120 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 1120 may be used to store overflow data if allocated RAM is not large enough to hold all working data. The non-volatile storage devices 1120 may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processor 1105. In one embodiment, the compiling process of the software program may transform program code written in a programming language to another computer language such that the processor 1105 is able to execute the programming code. For example, the compiling process of the software program may generate an executable program that provides encoded instructions (e.g., machine code instructions) for processor 1105 to accomplish specific, non-generic, particular computing functions.

After the compiling process, the encoded instructions may then be loaded as computer executable instructions or process steps to processor 1105 from storage device 1120, from memory 1110, and/or embedded within processor 1105 (e.g., via a cache or on-board ROM). Processor 1105 may be configured to execute the stored instructions or process steps in order to perform instructions or process steps to transform the computing device into a non-generic, particular, specially programmed machine or apparatus. Stored data, e.g., data stored by a storage device 1120, may be accessed by processor 1105 during the execution of computer executable instructions or process steps to instruct one or more components within the computing device 1100.

A user interface (e.g., output devices 1115 and input devices 1130) can include a display, positional input device (such as a mouse, touchpad, touchscreen, or the like), keyboard, or other forms of user input and output devices. The user interface components may be communicatively coupled to processor 1105. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the computing device 1100 may comprise other components well known in the art, such as sensors, powers sources, and/or analog-to-digital converters, not explicitly shown in FIG. 11.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application

What is claimed is:

1. A system for processing one or more query requests to search data within a cloud computing environment, comprising:
   one or more hardware processors; and
   a non-transitory memory storing instructions that, when executed by the one or more hardware processors, causes the one or more hardware processors to perform operations associated with the one or more query requests to search the data within the cloud computing environment, the operations comprising:
   receiving an indication of an encryption context assigned to a customer instance in the cloud computing environment based on a role of the customer instance, wherein the encryption context defines access to first encrypted data by the customer instance, and wherein a user account associated with the customer instance is allowed to access the first encrypted data based on the role being assigned to the user account;
   receiving, from the user account, a query request for a first search term to be performed on the first encrypted data, wherein the query request comprises instructions to perform a query on the first encrypted data for both of an unencrypted value of the first search term and a first encrypted value of the first search term, wherein the first encrypted value is accessed based on the encryption context being assigned to the customer instance and the role of the customer instance; and transmitting, to the user account, a result of the query based on the unencrypted value of the first encrypted data and the first encrypted value of the first encrypted data.

2. The system of claim 1, wherein the encryption context prevents access to a second encrypted value of second encrypted data by the customer instance or does not define access to the second encrypted value of the second encrypted data by the customer instance.

3. The system of claim 2, wherein the operations comprise receiving, from the user account, a second query request for a second search term to be performed on the second encrypted data, wherein the second query request omits instructions to query for the second encrypted value of the second encrypted data based on the encryption context preventing access to the second encrypted value of the second encrypted data by the customer instance or not defining access to the second encrypted value of the second encrypted data by the customer instance.

4. The system of claim 3, wherein the second query request comprises instructions to perform a second query on the second encrypted data for an unencrypted value of the second search term.

5. The system of claim 4, wherein the operations comprise transmitting, to the user account, a result of the second query based on the unencrypted value of the second search term, the second encrypted value of the second encrypted data, or both.

6. The system of claim 1, wherein the operations comprise receiving a second indication of a second encryption context assigned to the customer instance based on the role of the customer instance, wherein the second encryption context defines access to second encrypted data by the customer instance, and wherein the user account associated with the customer instance is allowed to access the second encrypted data based on the role being assigned to the user account.

7. The system of claim 6, wherein the second encryption context grants the customer instance access to an encrypted value of the second encrypted data and an unencrypted value of the second encrypted data.

8. The system of claim 1, wherein the operations comprise querying, using the unencrypted value of the first search term and the unencrypted value of the first search term, an index table that maps data content within an encrypted field of the first encrypted data to location information.

9. The system of claim 1, wherein the first encrypted data comprises an encrypted field, and wherein the encryption context defines access to the encrypted field.

10. A method to process one or more query requests to search data within a cloud computing environment, the method comprising:
receiving an indication of an encryption context assigned to a customer instance in the cloud computing environment based on a role of the customer instance, wherein the encryption context defines access to first encrypted data by the customer instance, and wherein a user account associated with the customer instance is allowed to access the first encrypted data based on the role being assigned to the user account;
receiving, from the user account, a query request for a first search term to be performed on the first encrypted data, wherein the query request comprises instructions to perform a query on the first encrypted data for both of an unencrypted value of the first search term and a first encrypted value of the first search term, wherein the first encrypted value is accessed based on the encryption context being assigned to the customer instance and the role of the customer instance; and
transmitting, to the user account, a result of the query based on the unencrypted value of the first encrypted data and the first encrypted value of the first encrypted data.

11. The method of claim 10, wherein the encryption context prevents access to a second encrypted value of second encrypted data by the customer instance or does not define access to the second encrypted value of the second encrypted data by the customer instance.

12. The method of claim 11, comprising receiving, from the user account, a second query request for a second search term to be performed on the second encrypted data, wherein the second query request omits instructions to query for the second encrypted value of the second encrypted data based on the encryption context preventing access to the second encrypted value of the second encrypted data by the customer instance or not defining access to the second encrypted value of the second encrypted data by the customer instance.

13. The method of claim 12, comprising transmitting, to the user account, a result of the second query request based on an unencrypted value of the second search term, the second encrypted value of the second encrypted data, or both, wherein the second query request comprises instructions to perform a second query on the second encrypted data for the unencrypted value of the second search term.

14. The method of claim 10, comprising receiving a second indication of a second encryption context assigned to the customer instance based on the role of the customer instance, wherein the second encryption context defines access to second encrypted data by the customer instance, and wherein the user account associated with the customer instance is allowed to access the second encrypted data based on the role being assigned to the user account.

15. The method of claim 14, wherein the second encryption context grants the customer instance access to an encrypted value of the second encrypted data and an unencrypted value of the second encrypted data.

16. The method of claim 10, comprising querying, using the unencrypted value of the first search term and the unencrypted value of the first search term, an index table that maps data content within an encrypted field of the first encrypted data to location information.

17. A non-transitory computer-readable storage medium comprising computer-readable code, that when executed by one or more hardware processors, causes the one or more hardware processors to perform operations of processing one or more query requests to search data within a cloud computing environment, the operations comprising:
receiving an assignment of an encryption context to a role for a customer instance in the cloud computing environment, wherein the encryption context defines access to a first encrypted field by the customer instance, wherein a user account associated with the customer instance is allowed to access the first encrypted field based on the role being assigned to the user account;
receiving a search request for a first term and a second term, and wherein the search request comprises instructions to:
search for the first term using both of an unencrypted version of the first term and a first encrypted value of the first term from the first encrypted field, wherein the first encrypted value of the first term is generated based on the encryption context and the assignment of the encryption context to the role; and search for the second term based on the search request associated with the user account using an unencrypted version of the second term, wherein the search request omits instructions to search for a second encrypted value of the second term based on the encryption context and the assignment of the encryption context to the role, the second term not being associated with the first encrypted field, or both; and transmitting, to the user account, a result of the search request based on the unencrypted version of the first term, the first encrypted value of the first term, and the unencrypted version of the second term.

18. The non-transitory computer-readable storage medium of claim 17, wherein the operations comprise receiving an assignment of a second encryption context to the role, wherein the second encryption context defines access to a second encrypted field by the customer instance, and wherein the second encryption context comprises a second encryption key encrypting data in the second encrypted field.

19. The non-transitory computer-readable storage medium of claim 18, wherein the search request comprises instructions to:

search for the first term using a third encrypted value of the first term from the second encrypted field, wherein the third encrypted value of the first term is generated based on the second encryption context and the access to the second encrypted field; and search for the second term using a fourth encrypted value of the second term from the second encrypted field, wherein the fourth encrypted value of the second term is generated based on the second encryption context and the access to the second encrypted field.

20. The non-transitory computer-readable storage medium of claim 17, wherein the operations comprise searching, using both of the unencrypted version of the first term and the first encrypted value of the first term, one or more index tables that maps data content within the first encrypted field and a second encrypted field to location information.

* * * * *